(12) United States Patent
Valipour (10) Patent No.: US 8,212,689 B2
(45) Date of Patent: Jul. 3, 2012

(54) OBJECTIVE, IN PARTICULAR FOR A DRIVER ASSISTANCE SYSTEM

(75) Inventor: Hamid Valipour, Berlin (DE)

(73) Assignee: Docter Optics GmbH (DE)

( * ) Notice: Subject to any disclaimer, the term of this patent is extended or adjusted under 35 U.S.C. 154(b) by 453 days.

(21) Appl. No.: 12/594,917

(22) PCT Filed: Mar. 10, 2008

(86) PCT No.: PCT/DE2008/000421
§ 371 (c)(1),
(2), (4) Date: Oct. 6, 2009

(87) PCT Pub. No.: WO2008/145075
PCT Pub. Date: Dec. 4, 2008

(65) Prior Publication Data
US 2010/0123567 A1    May 20, 2010

(30) Foreign Application Priority Data

May 30, 2007    (DE) .......................... 10 2007 025 108

(51) Int. Cl.
*G08B 1/017* (2006.01)
*G02B 15/14* (2006.01)
(52) U.S. Cl. ........ 340/937; 340/933; 340/435; 359/676; 359/683
(58) Field of Classification Search .................. 340/933, 340/937, 435, 436, 437; 348/148, 164, E5.042, 348/E5.052; 359/676, 683, 687, 689
See application file for complete search history.

(56) References Cited

U.S. PATENT DOCUMENTS

| | | | | |
|---|---|---|---|---|
| 6,134,389 | A | * | 10/2000 | Nakayama et al. ............. 396/73 |
| 6,249,374 | B1 | | 6/2001 | Chipper |
| 6,751,029 | B2 | * | 6/2004 | Horiuchi ........................ 359/687 |
| 6,850,373 | B2 | * | 2/2005 | Mihara et al. ................. 359/676 |
| 7,006,305 | B2 | * | 2/2006 | Amanai ......................... 359/791 |

(Continued)

FOREIGN PATENT DOCUMENTS

DE    03824969 C2    8/2000

(Continued)

OTHER PUBLICATIONS

PCT International Search Report for PCT/DE2008/000421 completed by the EP Searching Authority on Aug. 29, 2008.

(Continued)

*Primary Examiner* — Van T. Trieu
(74) *Attorney, Agent, or Firm* — Barnes & Thornburg LLP (57) ABSTRACT

The invention relates to an objective, particularly for infrared light and/or visible light, for imaging an object in an image plane, wherein the objective comprises an objective lens to be directed toward the object and an image lens directed toward the image plane, wherein the following applies with regard to imaging an object for each point within the image circle of the objective or for at least one point within the image circle of the objective: Formula (I), wherein $P_{max}$ represents the maximum light output of a point in the image plane for imaging a point on the object, and wherein $P_{min}$ represents the light output of an additional point in the image plane for imaging the point on the object, the light output of which with regard to imaging the point on the object is greater than the light output of each additional point in the image plane with regard to imaging the point on the object.

25 Claims, 7 Drawing Sheets

U.S. PATENT DOCUMENTS 7,177,092 B2 * 2/2007 Satori et al. .................. 359/683

FOREIGN PATENT DOCUMENTS

| DE | 69328440 | T2 | 9/2000 |
|----|----------|----|--------|
| DE | 10047207 | A1 | 4/2002 |
| DE | 10217843 | A1 | 11/2002 |
| DE | 10115665 | A1 | 1/2003 |
| DE | 10228638 | A1 | 1/2003 |
| DE | 10033599 | B4 | 8/2004 |
| DE | 102005032111 | A1 | 1/2007 |
| DE | 102006037895 | A1 | 3/2007 |
| EP | 1387199 | A1 | 2/2004 |
| EP | 1387199 | B1 | 6/2006 |
| JP | 2000171697 | A | 6/2000 |

OTHER PUBLICATIONS

An Office Action issued in connection with DE 102007025108.6.

* cited by examiner

OBJECTIVE, IN PARTICULAR FOR A DRIVER ASSISTANCE SYSTEM

CROSS-REFERENCE TO RELATED APPLICATIONS

This application is the U.S. national phase of PCT/DE2008/000421 filed Mar. 10, 2008. PCT/DE2008/000421 claims the benefit under the Convention of German Patent Application No. 10 2007 025 108.6 filed May 30, 2007.

FIELD OF THE INVENTION

The invention concerns an objective, in particular for infrared light and/or visible light, for imaging an object in an image plane. In particular, such image is to be digitalised.

BACKGROUND INFORMATION

DE 38 24 969 C2 discloses an objective for the range of the infrared and of the visible wave lengths having a collecting lens, on the surface of which a hologram has been provided which essentially is in the shape of a Fresnel lens and is configured for correction aberrations.

DE 693 28 440 T2 discloses an infrared camera having an optical arrangement in order to direct light/infrared radiation into a field of focal planes of infrared-sensitive microbolometers on a semiconductor substrate.

JP 2000171697 A, EP 1 387 199 B1 and U.S. Pat. No. 6,249,374 B1 disclose objectives having meniscus-shaped lenses.

DE 2006 037 895 A1 discloses an objective for imaging an object into an image plane, wherein the objective has an object lens to be made facing the object, and an image lens to be directed towards the image plane, and wherein the surface of the object lens to be directed towards the object is concave, and wherein the surface of the image lens to be directed towards the image plane is curved convexly with a radius of curvature $R_{140}$ such that the following applies:

$$R_{140} \leq \frac{d}{\frac{6\,mm}{d \cdot NA} - 2},$$

herein d being the distance between the light sensor and the surface of the image lens facing the light sensor, and NA being the numeric aperture of the objective.

In particular, it is an object of the invention to provide an objective or a corresponding camera particularly suited for recognizing the environment of a motor vehicle.

In this context, it is particularly desirable to provide an objective suitable for the application of logarithmic light sensors. It is particularly desirable to suggest an objective with high aperture and, in particular, having high light yield. It is particularly desirable to suggest a compact and robust objective. It is particularly desirable to suggest an objective having low distortion.

SUMMARY

The aforementioned problem is solved by an objective in particular suited for infrared light and/or for visible light, for imaging an object into an imaging plane, wherein the objective has an object lens to be directed towards the object and an imaging lens directed towards the plane of imaging, wherein the following applies with respect to the imaging of an object for every single point within an image circle of the objective or for at least one point within the image circle of the objective:

$$P_{dyn} > 70\,db,$$

wherein $$P_{dyn} = 10 \cdot \log\left(\frac{P_{max}}{P_{min}}\right),$$

wherein $P_{max}$ is the maximum light output of one point within the imaging plane for imaging a point of the object, and wherein $P_{min}$ is the light output of a further point in the imaging plane for imaging the point of the object, whose light output with regard to the imaging of the point of the object is larger than the light output of each further point within the imaging plane with regard to the imaging of the point of the object, or wherein $P_{min}$ is the maximum light output of the reflex image signals of the point of the object imaged in a further point.

In the sense of the invention, the image circle of the objective is in particular the region which the objective is able to cover, in particular without being affected by periphery vignetting. The imaging of an object in an image plane is, in particular, to be or to comprise the imaging in the infrared region and/or in the visible region. Imaging of an object in the sense of the invention, in particular, (also) images infrared light and/or visible light emitted or reflected by the object. A point in the sense of the invention in particular has a resolution of the objective or of a camera with an area or extension corresponding to such an objective.

The aforementioned objective is particularly suited for infrared cameras or infrared-capable cameras. The aforementioned objective is particularly suited for cameras with logarithmic light sensors. The aforementioned objective is particularly suited for cameras having a fixed or stable focus and/or for cameras being applied industrially. The aforementioned objective is particularly suited for a driver assistance system. The aforementioned objective is suited e.g. for cases of application as have been disclosed in DE 100 33 599 B4, DE 101 15 665 A1, DE 102 17 843 A1 or DE 102 28 638 A1. The aforementioned objective may be used e.g. in association with a source of infrared light. Possible sources of infrared light are e.g. disclosed in DE 102 17 843 A1 and DE 100 47 207 A1.

The following applies in an embodiment:

$$P_{dyn} > 80\,db$$

or in a particularly embodiment:

$$P_{dyn} > 90\,db.$$

Herein, it may be provided that the following applies:

$$P_{dyn} < 120\,db$$

In a yet further expedient embodiment of the invention, the surface of the image lens facing the image plane is curved convexly with a radius of curvature R140 such, that the following applies:

$$R_{140} \leq \frac{d}{\frac{0,8DB}{d \cdot NA} - 2},$$

wherein d is the distance between the image plane and the surface of the image lens facing the image plane, wherein NA is the numeric aperture of the objective, and wherein DB is the diameter of the image circle of the objective. In the sense of the invention, a surface of a lens is in particular to be an optically operative/effective surface of this lens.

In a furthermore expedient embodiment of the invention, the external light portion of the objective is smaller than 0.8%. In a yet further embodiment of the invention, the objective has at least one first central lens arranged between the object lens and the image lens. In a still further expedient embodiment of the invention, the objective has a second central lens between the object lens and the first central lens. In a yet further embodiment of the invention, the image lens is a positive lens or a collective lens.

In a still further embodiment of the invention, the image plane is situated at an edge of the image lens. In a still further expedient embodiment of the invention, the image plane is situated in the image lens. In a still further expedient embodiment of the invention, the image lens is a negative lens or a diffuser lens. In an even further expedient embodiment of the invention, the optically operative surface of the image lens situated on the side of the object is curved convexly. In a yet further embodiment of the invention, the optically operative surface of the image lens situated on the side of the object is curved such including a radius of curvature R that the following applies:

$$R \leq \frac{\alpha \cdot d^2 \cdot NA}{DB}$$

wherein d is the thickness of the image lens, wherein NA is the numeric aperture of the objective, wherein DB is the image circle diameter of the objective, and wherein α is smaller or equal to 5, in particular smaller or equal to 3, advantageously smaller or equal to 2.5.

In a still further embodiment of the invention, the region of the imageable light lies in a region between approximately 400 nm and approximately 900 nm.

An improved night vision device comprises an infrared light sensor and an aforementioned objective for imaging an object onto the infrared light sensor, wherein the night vision device includes a display for representing an image taken by means of the infrared light sensor.

An improved driver assistance system for a vehicle comprises a light sensor and an aforementioned objective for imaging an object onto the light sensor, wherein the driver assistance system includes a display for representing an image taken by means of the light sensor.

DETAILED DESCRIPTION

Figure 1:
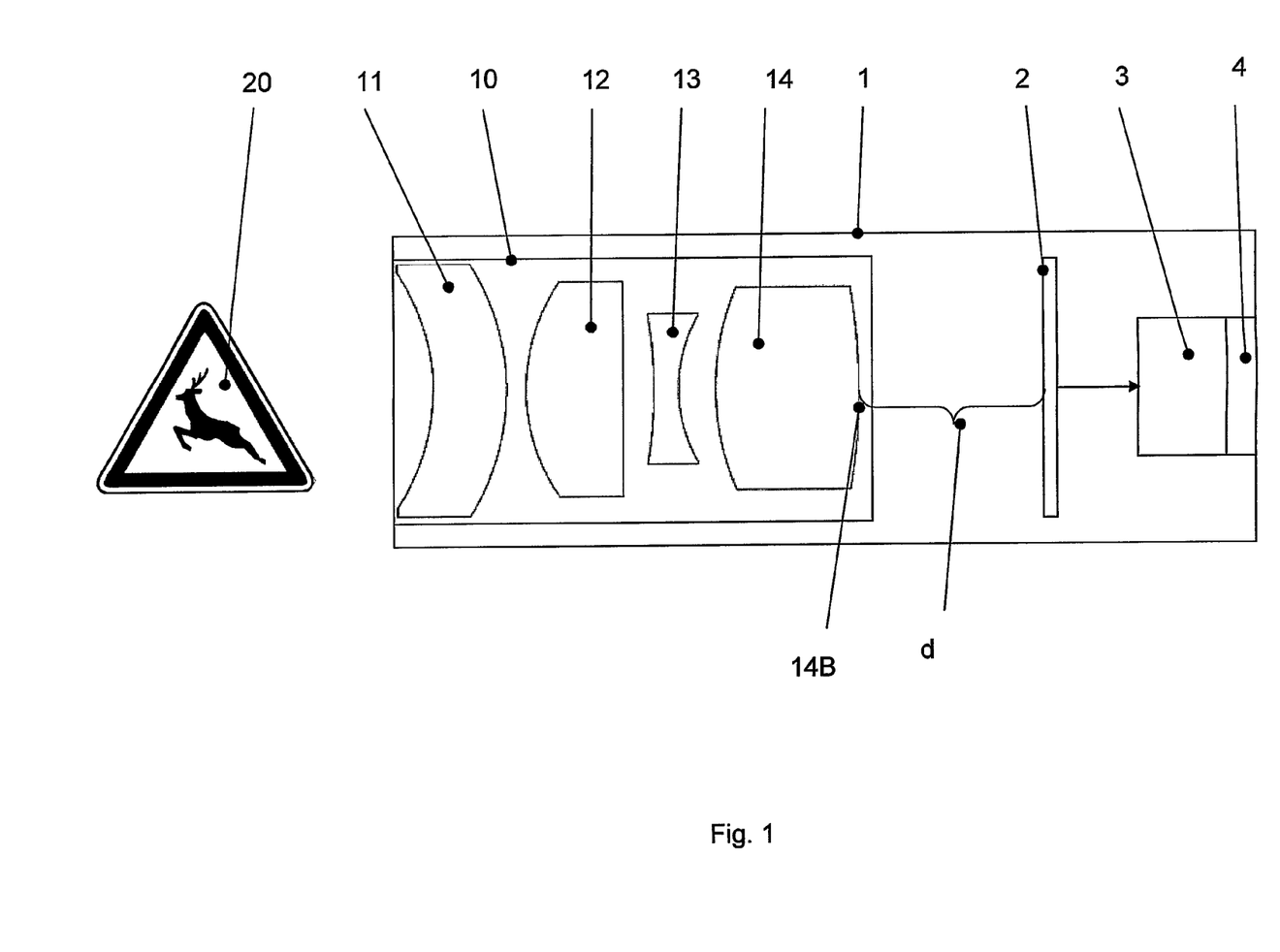
FIG. 1 shows a principal representation of an example of embodiment of a camera.

FIG. 1 shows a principal representation of an example of embodiment of a camera 1. The camera 1 comprises an objective 10, in particular for infrared light and/or visible light, for imaging an object 20 into an image plane. The objective 10 optionally comprises a meniscus-like or meniscus-shaped object lens 11 to be directed towards the object 20, which object lens is particularly suited for being applied in systems of driver assistance. The objective 10 moreover comprises an image lens 14 designed as a positive lens or collective lens and to be directed towards the image plane, a central lens 12 designed as a positive lens or a collective lens and situated between the object lens 11 and the image lens 14, and a central lens 13 designed as a negative lens or diffuser lens and arranged between the object lens 11 and the image lens 14.

The camera 1 comprises a logarithmic light sensor 2 arranged in the image plane, by means of which sensor an image or an infrared image of the object can be taken. A signal emitted by the logarithmic light sensor 2 may be processed by digital data processing (facilities) 3 or evaluation (facilities) associated with the camera 1, and may be emitted as a digital image signal via an interface 4.

The surface 14B of the image lens 14 directed towards the light sensor 2 is curved convexly including a radius of curvature $R_{14B}$ such that the following applies:

$$R_{140} \leq \frac{d}{\frac{0,8 \cdot DB}{d \cdot NA} - 2},$$

wherein d is the distance between the light sensor and the surface 14B of the image lens 14 facing the light sensor 2, wherein NA is the numeric aperture of the objective 10, and wherein DB is the image circle diameter of the objective 10. With reference to the objective 10, the image circle diameter DB amounts to at least 6 mm, advantageously to at least 8 mm.

Figure 2:
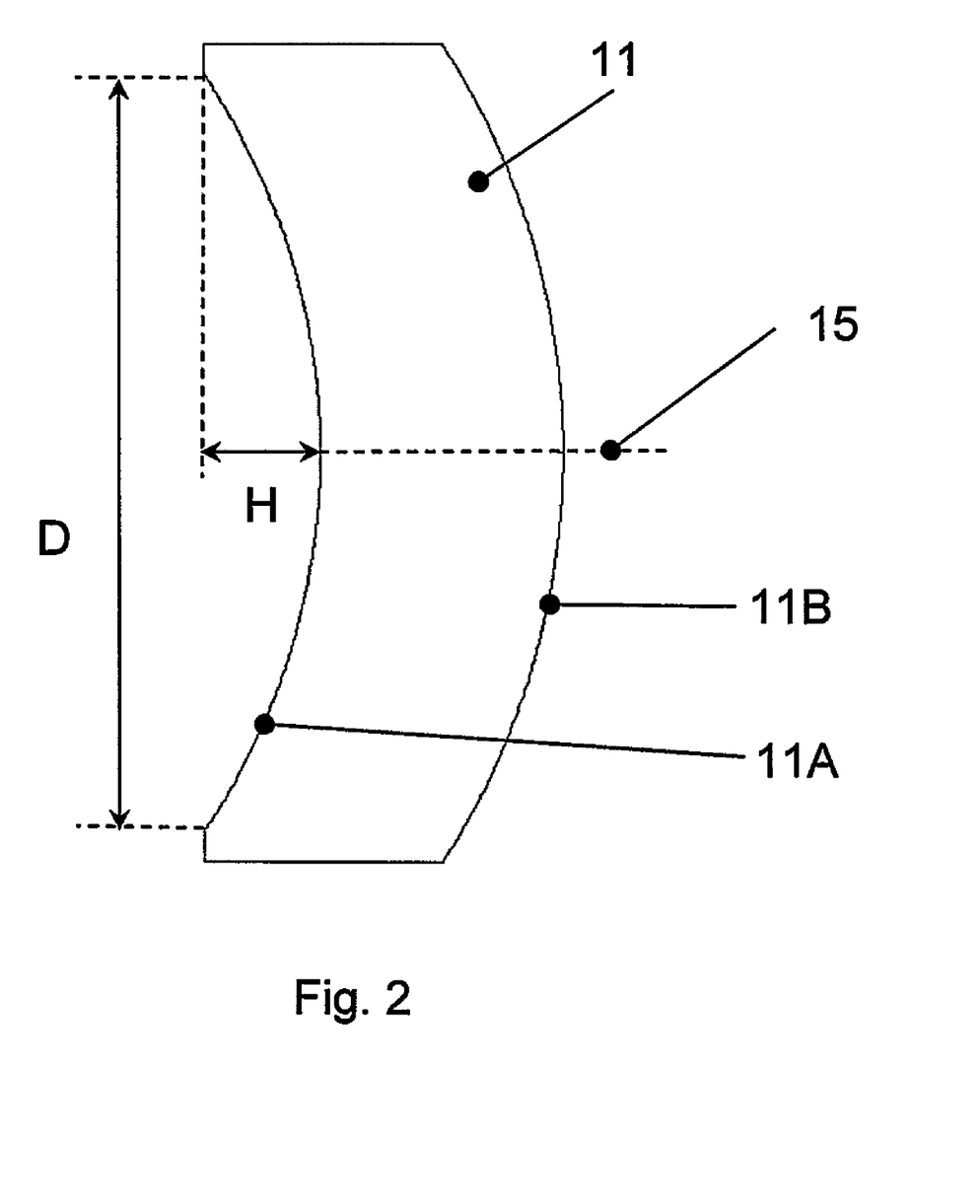
FIG. 2 shows an example of embodiment of a meniscus-like or meniscus-shaped object lens.

FIG. 2 shows a meniscus-like or meniscus-shaped object lens 11. Herein, reference numeral 11B designates a convex surface of the object lens 11 to be directed away from the object, and reference numeral 11A designates a concave surface of the object lens 11 to be directed towards, i.e. facing the object 20. The ratio H/D of a distance H taken in parallel to the optical axis 15 of the object lens 11, between a position at the edge of the surface 11A to be made facing the object 20, between the edge of the surface 11A to be made facing the object 20 or between an essential part of the edge of the surface 11A to be made facing the object 20, and the centre of the surface 11A to be made facing the object 20 or the (virtual) point of intersection of the surface 11A to be made facing the object with the optical axis 15 of the object lens 11 to a diameter D of the surface 11A to be made facing the object 20, in an embodiment amounts to 0.14 to 0.18, in particular 0.15 to 0.17. In the example of embodiment represented in FIG. 2, this ratio amounts to approximately 0.16.

Figure 3:
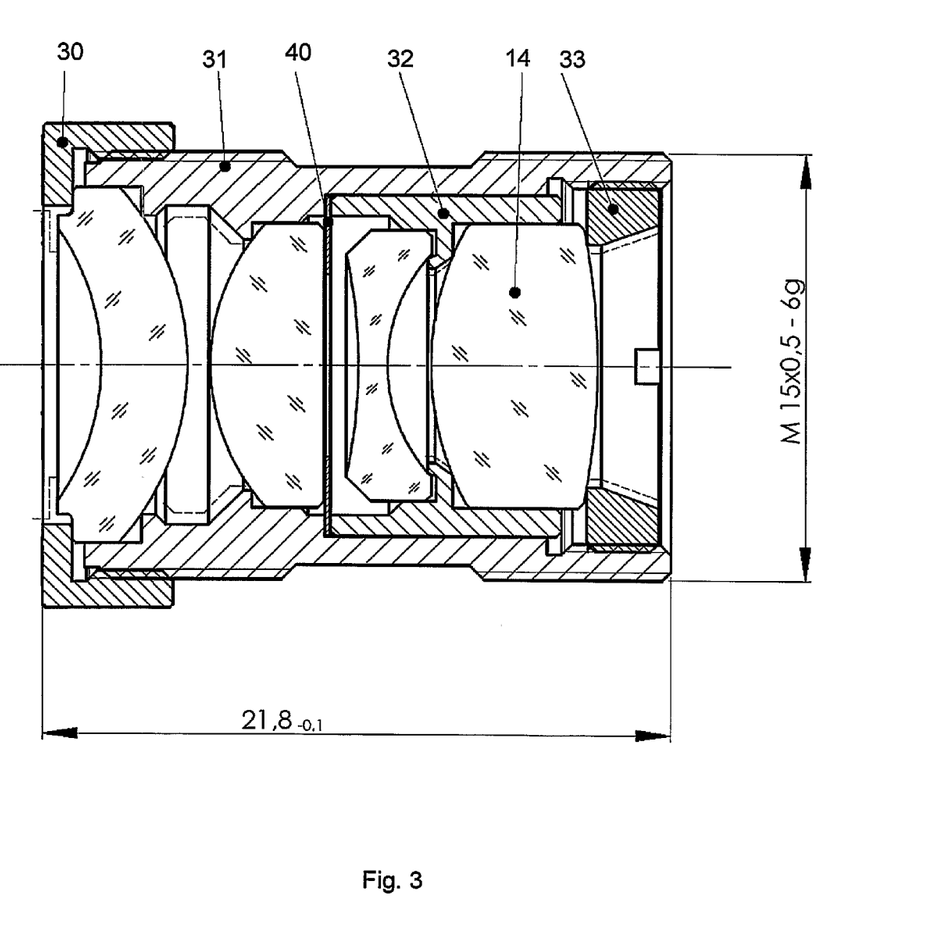
FIG. 3 shows a technical drawing of the camera according to FIG. 1.
Figure 4:
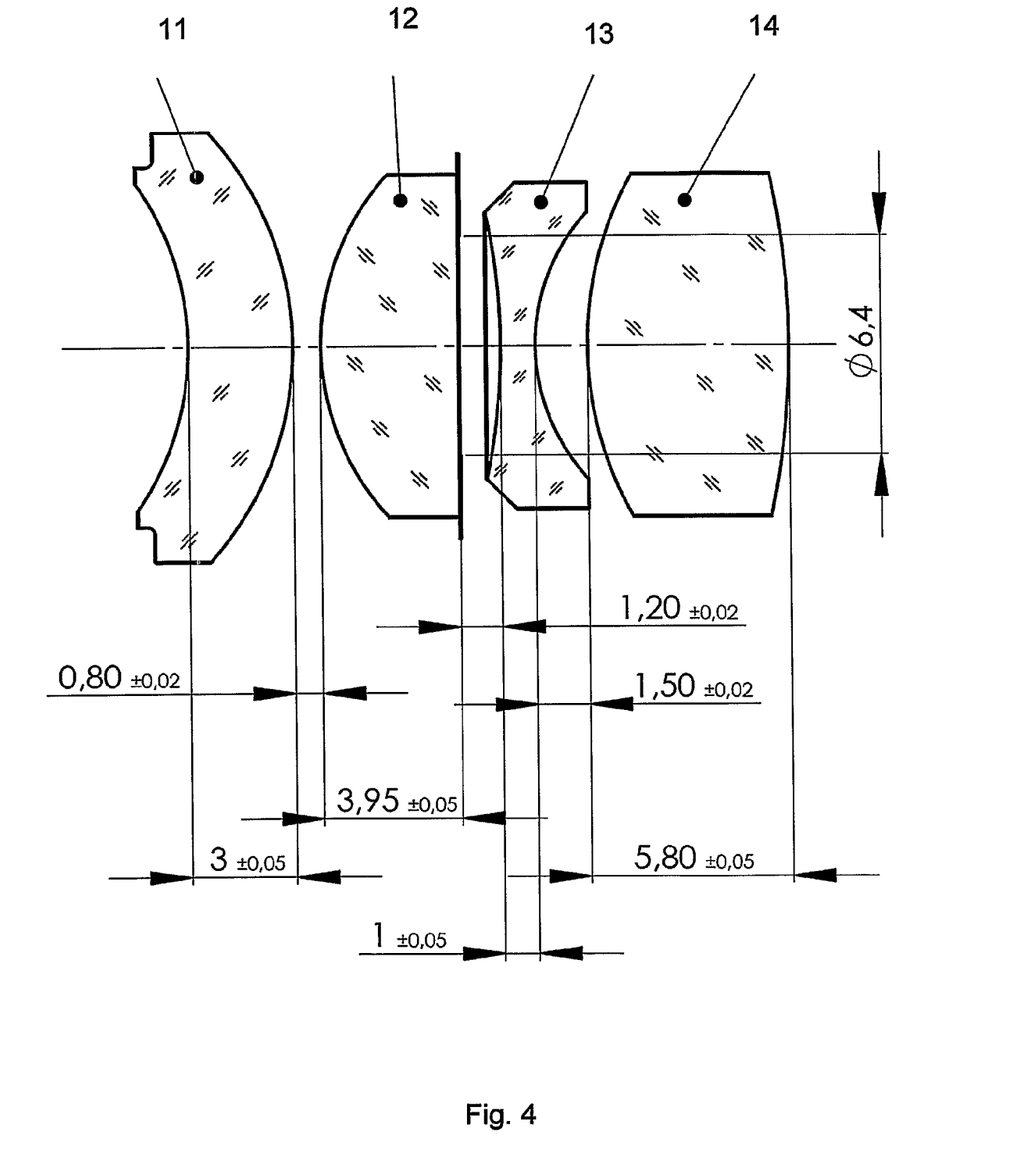
FIG. 4 shows a further technical drawing of the camera according to FIG. 1.

The value of the curvature radius of the surface 11B of the object lens 11 to be made facing away from the object 20 amounts to 90% to 130%, in particular 100% to 120% of the value of the curvature radius of the surface 11A of the object lens to be made facing the object 20. Further dimensions of the objective may be taken from the technical drawings represented in FIG. 3 and FIG. 4, wherein the values of dimension are given in the unit of millimetres. In FIG. 3, reference numeral 40 designates a diaphragm, reference numeral 30 designates a front cover, reference numeral 31 designates a housing, reference numeral 32 designates an inner housing, and reference numeral 33 designates a rear cover.

Figure 5:
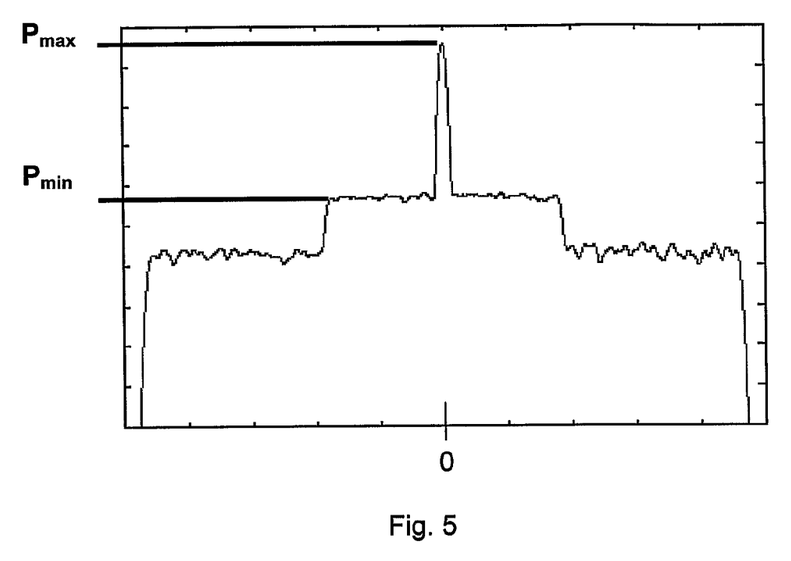
FIG. 5 shows the light output plotted over the distance from a viewed point of an object.

The portion of external light of the objective 10 is smaller than 0.8%. Referring to the representation of an object 20, the value $P_{dyn}$, with $$P_{dyn} = 10 \cdot \log\left(\frac{P_{max}}{P_{min}}\right)$$

for all points within the image circle of the objective 10, amounts to approximately 90 DB, wherein, as shown in FIG. 5, $P_{max}$, is the maximum light output of a point in the image plane for imaging a point of the object 20, and wherein $P_{min}$ is the light output of a further point within the image plane for imaging the point of the object 20, whose light output, with reference to the imaging of the point of the object 20, is larger than the light output of each further point within the image plane with reference to the imaging of the point of the object 20, or wherein $P_{min}$ is the maximum light output of the reflex image signals of the points of object 20 imaged in a further point. Herein, and shown in FIG. 5, by way of a simplified representation of the definition of value $P_{dyn}$ merely serving the explanation of the definition, the light output has been plotted logarithmically over the distance from the viewed point of object 20.

Figure 6:
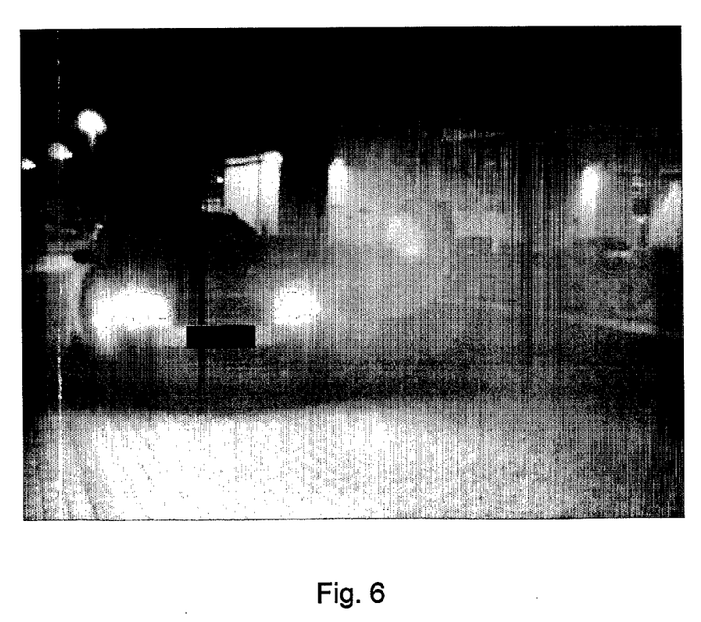
FIG. 6 shows an image taken by means of a common objective.
Figure 7:
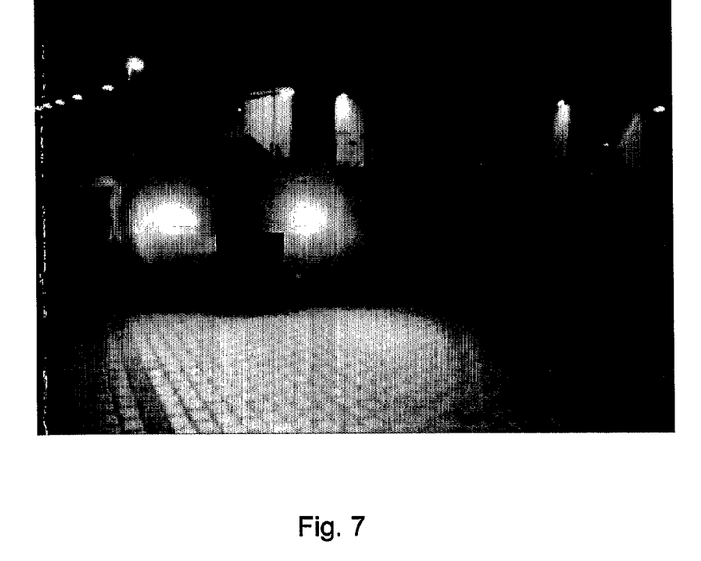
FIG. 7 shows an image taken with the objective of the camera according to FIG. 1.

FIG. 6 and FIG. 7 clarify the properties of the objective 10 by way of an example of a night scene showing a motor vehicle with dimmed headlights on and a pedestrian standing on the right-hand side of the motor vehicle. Herein, the picture represented in FIG. 6 has been taken with an objective as usually applied in motor vehicles, whereas the picture shown in FIG. 7 has been recorded with the objective 10. Comparing the two pictures, it may be concluded that the pedestrian can be seen clearly better in the figure represented in FIG. 7.

Figure 8:
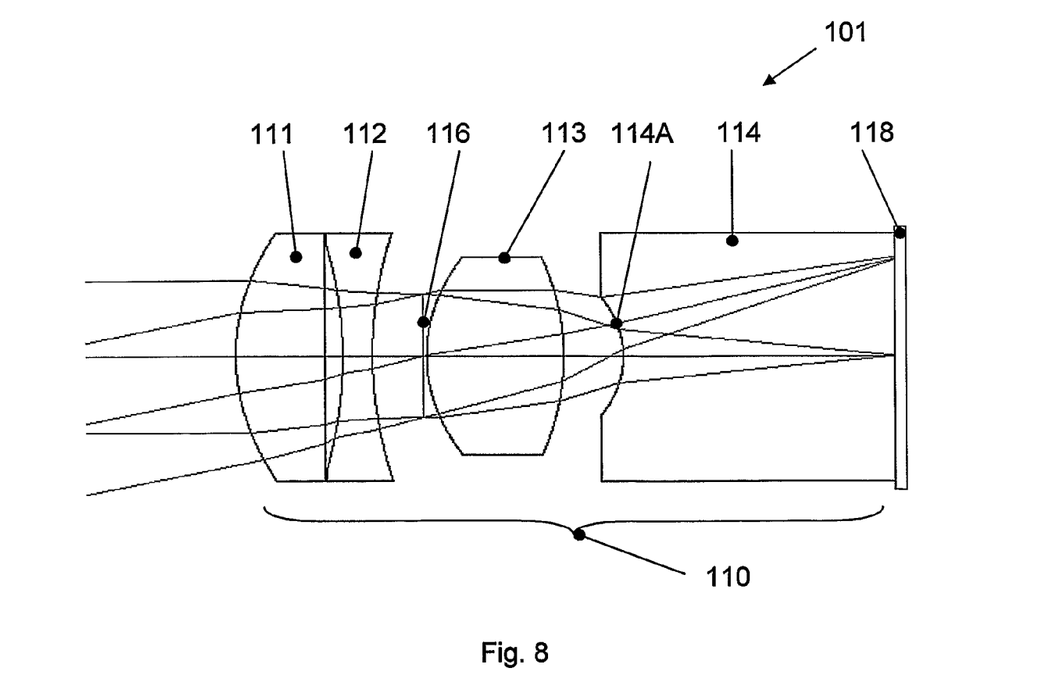
FIG. 8 shows a principal representation of a further example of embodiment of a camera.

FIG. 8 shows a principal representation of a further example of embodiment of a camera 101 having an objective 110 according to the invention, in particular for infrared light and/or visible light, for imaging/mapping an object into an imaging plane. The objective 110 comprises an object lens 111 configured as a positive lens or collective lens to be made facing the object, an image lens 114 configured as a negative lens or as a diffuser lens to be directed towards the image plane, a central lens 112 designed as a negative lens or as a diffuser lens arranged between the object lens 11 and the image lens 114, and a central lens 113 configured as a positive lens or a collective lens and arranged between the object lens 111 and the image lens 114. The camera 101 comprises a logarithmic light sensor 118 arranged in the image plane and connected with the image lens 114, by means of which sensor an image or the infrared light image of the object may be taken. A diaphragm is arranged between the central lens 112 and the central lens 113, the aperture of which diaphragm having been designated by reference numeral 116. In a modification thereof, the logarithmic light sensor 118 has been arranged within the image lens 114.

The objective 110 has a focal distance of 17 mm and a length of 22 mm. The numeric aperture amounts to 0.184. The spectrum according to the application lies between 400 nm and 900 nm. The f-number amounts to 2.7. The thickness of the image lens 14 amounts to 9.4 mm. The optically operative surface 114A of the image lens 14, arranged on the side of the object, is curved by a radius of curvature of 4.2 mm.

Figure 9:
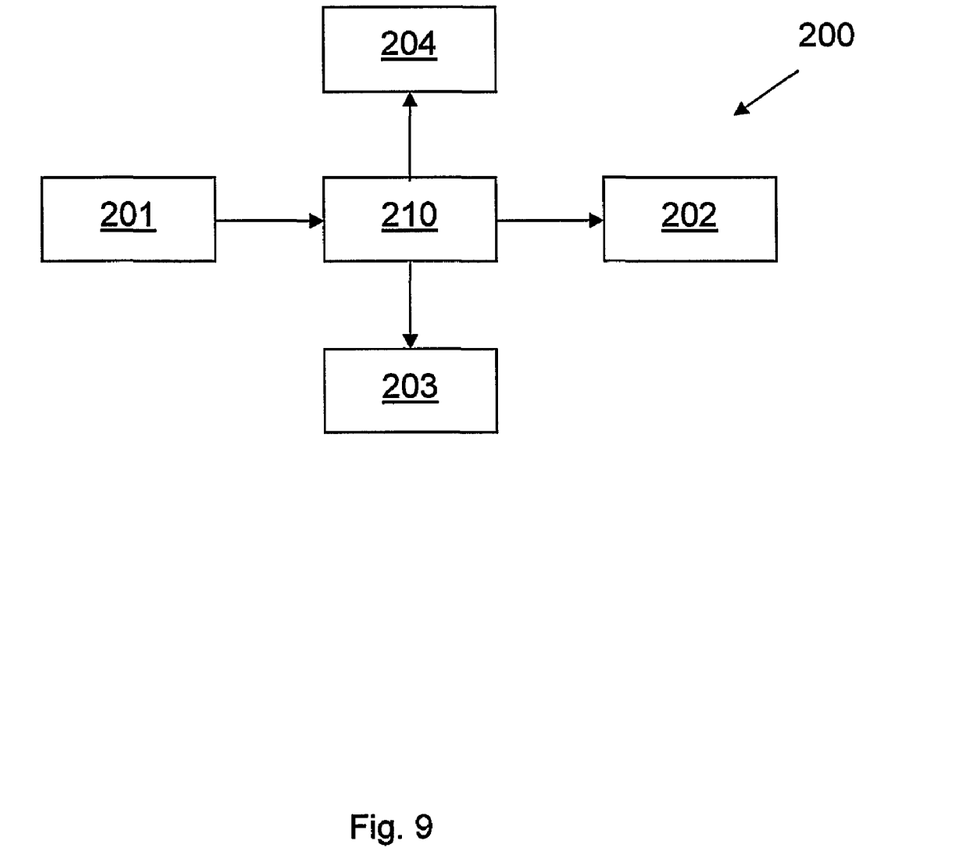
FIG. 9 shows a driver assistance system designed as a night vision device.

FIG. 9 shows a driver assistance system 200 designed as a night vision device for a vehicle, in particular for a motor vehicle. The night vision device 200 comprises a camera 201 having an objective whose value $P_{dyn}$ is more than 70 DB, advantageously more than 80 DB. Cameras 1 and 101 are particularly appropriate embodiments of the camera 201. The driver assistance system 200 moreover comprises an evaluation device 210 as well as a display 202 for displaying an image taken by means of camera 201, as well as additional information generated by the evaluation device 210 such as e.g. information, indications or warnings. The evaluation device 210 may serve pattern detection or identification of objects or indicia within the image taken by means of the objective either additionally or alternatively.

It may be provided that the driver assistance system 200 comprises a haptic and/or acoustic output device 203 for emitting additional information generated by the evaluation device 210, such as e.g. indications or warnings. Moreover, there may be provided an electronic log book 204 for recording images taken by means of camera 201 and/or additional information such as e.g. indications or warnings generated by the evaluation device 210.

The invention claimed is:

1. Objective for imaging an object into an image plane, the objective comprising:
   an object lens to be directed towards the object; and
   an image lens facing the image plane;
   wherein with reference to the imaging of an object, the following applies for each point within the image circle of the objective or for at least one point within the image circle of the objective:

$$P_{dyn} > 90db,$$
   with
   $$P_{dyn} = 10 \cdot \log\left(\frac{P_{max}}{P_{min}}\right),$$

wherein $P_{max}$ is the maximum light output of a point within the image plane for imaging a point of the object, and wherein $P_{min}$ is the light output of a further point within the image plane for imaging the point of the object, whose light output, with reference to the imaging of the point of the object is larger than the light output of each further point within the image plane referring to the imaging of the point of the object.

2. Objective according to claim 1, wherein the external light portion of the objective is smaller than 0.8%.

3. Objective according to claim 1, wherein the objective further comprising:
   at least one first central lens arranged between the object lens and the image lens; and
   a second central lens between the object lens and the first central lens.

4. Objective according to claim 1, wherein the image lens is a positive lens.

5. Objective according to claim 1, wherein the image plane is situated at an edge of the image lens.

6. Objective according to claim 1, wherein the image plane is situated in the image lens.

7. Objective according to claim 1, wherein the image lens is a negative lens or a diffuser lens.

8. Objective for imaging an object into an image plane, the objective comprising:
an object lens to be directed towards the object; and
an image lens facing the image plane;
wherein with reference to the imaging of an object, the following applies for each point within the image circle of the objective or for at least one point within the image circle of the objective:

$$P_{dyn} > 70db,$$

with $$P_{dyn} = 10 \cdot \log\left(\frac{P_{max}}{P_{min}}\right),$$

wherein $P_{max}$ is the maximum light output of a point within the image plane for imaging a point of the object, and wherein $P_{min}$ is the maximum light output of the reflex image signals of the point of the object imaged in a further point.

9. Objective according to claim 8, wherein the objective further comprising:
at least one first central lens arranged between the object lens and the image lens; and
a second central lens between the object lens and the first central lens.

10. Objective according to claim 8, wherein the image lens is a positive lens, and wherein the image lens is a negative lens or a diffuser lens.

11. Objective according to claim 8, wherein the image plane is situated at an edge of the image lens.

12. Objective according to claim 8, wherein the image plane is situated in the image lens.

13. Driver assistance system for a vehicle, the driver assistance system comprising:
a light sensor;
a display for representing an image taken by means of the light sensor; and
an objective for imaging an object onto the light sensor, the objective comprising
an object lens to be directed towards the object; and
an image lens facing the image plane;
wherein with reference to the imaging of an object, the following applies for each point within the image circle of the objective or for at least one point within the image circle of the objective:

$$P_{dyn} > 70db,$$

with $$P_{dyn} = 10 \cdot \log\left(\frac{P_{max}}{P_{min}}\right),$$

wherein $P_{max}$ is the maximum light output of a point within the image plane for imaging a point of the object, and wherein $P_{min}$ is the maximum light output of the reflex image signals of the point of the object imaged in a further point.

14. Driver assistance system according to claim 13, wherein the objective further comprising:
at least one first central lens arranged between the object lens and the image lens; and
a second central lens between the object lens and the first central lens.

15. Driver assistance system according to claim 13, wherein the image lens is a positive lens, and wherein the image lens is a negative lens or a diffuser lens.

16. Driver assistance system according to claim 13, wherein the image plane is situated at an edge of the image lens.

17. Driver assistance system according to claim 13, wherein the image plane is situated in the image lens.

18. Driver assistance system according to claim 13, further comprising:
a pattern identification system of objects within the image taken by means of the objective.

19. Driver assistance system according to claim 18, wherein the objective further comprising:
at least one first central lens arranged between the object lens and the image lens; and
a second central lens between the object lens and the first central lens.

20. Driver assistance system according to claim 19, wherein the image lens is a positive lens, and wherein the image lens is a negative lens or a diffuser lens.

21. Driver assistance system for a vehicle, the driver assistance system comprising:
a logarithmic light sensor;
a display for representing an image taken by means of the light sensor; and
an objective for imaging an object onto the light sensor, the objective comprising
an object lens to be directed towards the object; and
an image lens facing the image plane;
wherein with reference to the imaging of an object, the following applies for each point within the image circle of the objective or for at least one point within the image circle of the objective:

$$P_{dyn} > 70db,$$

with $$P_{dyn} = 10 \cdot \log\left(\frac{P_{max}}{P_{min}}\right),$$

wherein $P_{max}$ is the maximum light output of a point within the image plane for imaging a point of the object, and wherein $P_{min}$ is the light output of a further point within the image plane for imaging the point of the object, whose light output, with reference to the imaging of the point of the object is larger than the light output of each further point within the image plane referring to the imaging of the point of the object.

22. Driver assistance system according to claim 21, wherein the objective further comprising:
at least one first central lens arranged between the object lens and the image lens; and
a second central lens between the object lens and the first central lens;

wherein the image lens is a positive lens, and wherein the image lens is a negative lens or a diffuser lens.

23. Driver assistance system according to claim 22, further comprising:
a pattern identification system of objects within the image taken by means of the objective.

24. Driver assistance system according to claim 21, further comprising:
a pattern identification system of objects within the image taken by means of the objective.

25. Night vision device comprising:
an infrared light sensor;
a display for representing an image taken by means of the infrared light sensor; and
an objective for imaging an object onto the light sensor, the objective comprising
an object lens to be directed towards the object; and
an image lens facing the image plane;
wherein with reference to the imaging of an object, the following applies for each point within the image circle of the objective or for at least one point within the image circle of the objective:

$$P_{dyn} > 90 db,$$

with $$P_{dyn} = 10 \cdot \log\left(\frac{P_{max}}{P_{min}}\right),$$

wherein $P_{max}$ is the maximum light output of a point within the image plane for imaging a point of the object, and wherein $P_{min}$ is the light output of a further point within the image plane for imaging the point of the object, whose light output, with reference to the imaging of the point of the object is larger than the light output of each further point within the image plane referring to the imaging of the point of the object.

* * * * *